UNITED STATES PATENT OFFICE.

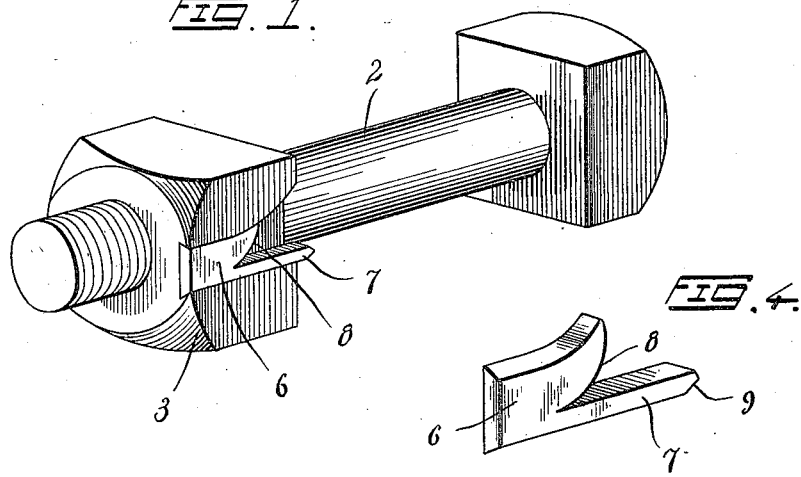
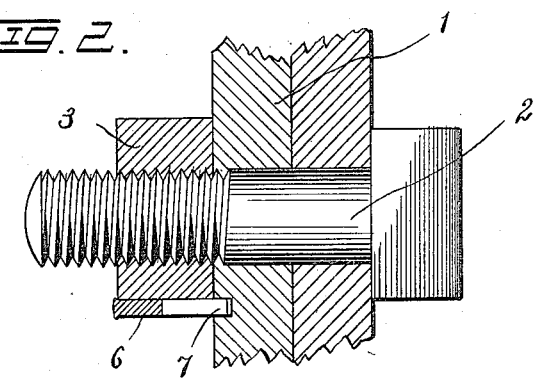
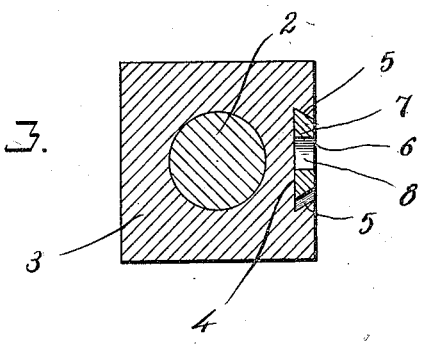

ROBERT MULON, OF JACKSONVILLE, FLORIDA.

NUT-LOCK.

1,081,549. Specification of Letters Patent. Patented Dec. 16, 1913.

Application filed November 5, 1912. Serial No. 729,632.

*To all whom it may concern:*

Be it known that I, ROBERT MULON, a citizen of the United States, residing at Jacksonville, in the county of Duval and State of Florida, have invented new and useful Improvements in Nut-Locks, of which the following is a specification.

The present invention relates to improvements in nut locks.

In carrying out the invention it is my purpose to provide an ordinary nut with a resilient member which is adapted to serve as a ratchet tooth which will permit of the nut being screwed home upon the bolt, but which will effectively bite into the structure to which the bolt and nut is attached to prevent the un-screwing of the nut.

With the above object in view, and others which will appear as the invention is more fully disclosed, the improvement resides in the construction, combination and arrangement of parts herein set forth and claimed.

In the drawing, Figure 1 is a perspective view of a nut provided with my improvement and showing the same screwed upon a bolt. Fig. 2 is a detail sectional view illustrating the position of the locking element when the nut has been screwed home upon the bolt. Fig. 3 is a transverse sectional view taken through the nut. Fig. 4 is a detail perspective view of the locking member or key.

Referring now to the drawing in detail, the numeral 1 designates a substructure to which the bolt and nut are attached. The substructure 1 may be in the form of beams, bridge structure, connecting plates for rail joints or other devices either formed of metal or of wood. The bolt 2 is provided with a co-acting nut 3. The bolt and nut are each of the ordinary construction, but the nut has one of its faces or sides provided with a substantially V-shaped depression, the larger portion of which communicates with the inner face of the nut. The depression provides an inner flat wall 4, and the inclined side walls formed thereby are inclined or beveled from the outer surface of the nut to the said wall 4 as designated by the numeral 5.

The numeral 6 designates the locking member or key. This key comprises a flat member of a substantially V-shaped formation and has both of its side edges inclined or beveled to snugly engage the beveled side walls 5 of the nut 3. The key 6 is provided upon one of its sides with an extending finger 7 which is formed of some suitable spring material, and which projects a suitable distance beyond the inner face of the nut 3. By reference to the figures of the drawing, it will be noted that the body of the key is of a length approximately equaling one-half of the thickness or length of the nut, and as a consequence occupies only one-half of the depression in the nut, the said body being seated adjacent the outer face of the nut. The inner edge of the key is inclined from one of its beveled sides toward the inner edge of the key finger 7, as designated by the numeral 8. This inclined end 8 is provided to permit of the spring finger assuming a desired angle within the depression when the end thereof is forced to bite the substructure, when the nut is screwed home upon the bolt. The outer side of the finger is preferably beveled or inclined at its end, as designated by the numeral 9, and whereby the finger may travel over the substructure when the nut is screwed upon the bolt without depressing the said substructure, (owing to the resiliency of the finger) until the nut is screwed entirely home when the said finger, through the resiliency thereof, contacts with the inclined inner end 8 of the body of the key.

Having thus described the invention, what I claim is:—

1. A nut for the purpose set forth having one of its sides formed with a substantially V-shaped depression, the side walls provided thereby being inwardly beveled, a key embodying a V-shaped body having beveled sides arranged within the depression and engaging with the beveled edges thereof, and said key being provided with a spring finger which extends beyond one of the faces of the nut.

2. A nut, for the purpose set forth having one of its sides provided with a V-shaped depression forming a pocket, a key member secured within the pocket and occupying approximately one-half of the pocket, the said key having a spring finger extending from one of the side edges thereof and projecting beyond the inner face of the nut, and the inner edge of the key being inclined from its side toward the spring hanger, substantially as and for the purpose set forth.

In testimony whereof I affix my signature in presence of two witnesses.

ROBERT MULON.

Witnesses:
E. J. MEIDT,
MELVIN M. GARRISON.

Copies of this patent may be obtained for five cents each, by addressing the " Commissioner of Patents, Washington, D. C."